US006772106B1

(12) United States Patent
Mahlke et al.

(10) Patent No.: US 6,772,106 B1
(45) Date of Patent: Aug. 3, 2004

(54) RETARGETABLE COMPUTER DESIGN SYSTEM

(75) Inventors: Scott A. Mahlke, Mountain View, CA (US); Santosh G. Abraham, Pleasanton, CA (US); Vinod K. Kathail, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/378,580

(22) Filed: Aug. 20, 1999

(51) Int. Cl.$^7$ .................................................. G06F 9/44

(52) U.S. Cl. .......................... 703/21; 703/22; 717/128

(58) Field of Search .............................. 703/21, 22, 23, 703/14, 15, 16; 717/125, 141, 156, 128, 137–139, 147–149

(56) References Cited

U.S. PATENT DOCUMENTS

| 5,274,811 | A | * | 12/1993 | Borg et al. ................... 717/128 |
| 5,613,117 | A | * | 3/1997 | Davidson et al. ........... 717/144 |
| 5,854,929 | A | * | 12/1998 | Van Praet et al. .......... 717/156 |
| 5,867,400 | A | * | 2/1999 | El-Ghoroury et al. ......... 716/1 |
| 5,896,521 | A | * | 4/1999 | Shackleford et al. ......... 703/21 |
| 5,911,059 | A | * | 6/1999 | Profit, Jr. ...................... 703/23 |
| 5,918,035 | A | * | 6/1999 | Van Praet et al. ............. 703/22 |
| 5,999,732 | A | * | 12/1999 | Bak et al. .................... 717/148 |
| 6,026,238 | A | * | 2/2000 | Bond et al. .................. 717/141 |
| 6,038,391 | A | * | 3/2000 | Kawaba ........................ 703/21 |
| 6,044,222 | A | * | 3/2000 | Simons et al. .............. 717/156 |
| 6,067,412 | A | * | 5/2000 | Blake et al. ................. 709/102 |
| 6,195,748 | B1 | * | 2/2001 | Chrysos et al. ............. 712/227 |
| 6,226,776 | B1 | | 5/2001 | Panchul et al. ................. 716/3 |
| 6,282,701 | B1 | * | 8/2001 | Wygodny et al. ........... 717/125 |
| 6,367,033 | B1 | * | 4/2002 | Jibbe ............................ 714/37 |
| 6,463,582 | B1 | * | 10/2002 | Lethin et al. ................ 717/158 |
| 6,604,067 | B1 | * | 8/2003 | Abraham et al. ............. 703/21 |

FOREIGN PATENT DOCUMENTS

EP        1011044 A2 * 6/2000 ............. G06F/9/45

OTHER PUBLICATIONS

Chernoff et al., "FX !32—A profile directed binary translator", IEEE, 1998.*
Kirovski et al., "Application Driven Synthesis of Core–based systems", Proceedings of the IEEE International Conference on Computer Aided design, 1997.*
Hadjiyiannis et al., "ISDL:An instruction set description language for Retargetability", DAC97, 1997.*
Hoogerbrugge et al., "Automatic Synthesis of transport Triggered Processors", Proceedings of the First Annual Conference of Advanced School for Computing and Imaging, The Netherlands, 1995.*

(List continued on next page.)

*Primary Examiner*—Kevin J. Teska
*Assistant Examiner*—K Thangavelu

(57) ABSTRACT

An automatic and retargetable computer design system is using a combination of simulation and performance prediction to investigate a plurality of target computer systems. A high-level specification and a predetermined application are used by the computer design system to provide inputs into a computer evaluator. The computer evaluator has reference computer system dependent and independent systems for producing a reference representation and dynamic behavior information, respectively, of the application. The reference representation and information are mated to produce further information to drive a simulator. The simulator provides performance information of a reference computer system. The performance information is provided to another computer evaluator, which has a target computer system dependent system for producing a target representation of the application for the plurality of target computer systems. The performance information and the target representation are used by a computer system predictor for quickly estimating the performance information of the plurality of target computer systems in a simulation efficient manner.

30 Claims, 4 Drawing Sheets

OTHER PUBLICATIONS

Mulder et al., "Cost–effective design of application specific VLIW processors using the SCARCE Framework", Proceedings of the 22$^{nd}$ Workshop on Microprogramming and Microarchitectures, 1989.*

Jan Hoogerbrugge and Henk Corporaal, "Automatic Synthesis of Transport Triggered Processors", Proceedings of the First Annual Conference Advanced School for Computing and Imaging, Heijen, The Netherlands, 1995.

Hans Mulder and Robert J. Portier, "Cost–effective Design of Application Specific VLIW Processors Using the SCARCE framework", Proceedings of the 22nd Workshop on Microprogramming and Microarchitectures, 1989.

Darko Kirovski, Chunho Lee, Miodrag Potkonjak, and WilliamMangionne–Smith, "Application–Driven Synthesis of Core–Based Systems", Proceedings of the IEEE International Conference on Computer Aided Design, 1997.

* cited by examiner

RETARGETABLE COMPUTER DESIGN SYSTEM

CROSS-REFERENCE TO RELATED APPLICATIONS

The present application contains subject matter related to a concurrently filed U.S. Patent Application by Shail Aditya Gupta, Bantwal Ramakrishna Rau, Vinod Kumar Kathail, and Michael S. Schlansker entitled "AUTOMATIC DESIGN OF VLIW PROCESSORS". The related application is identified by Ser. No. 09/378,395, now U.S. Pat. No. 6,385,757, and divisional applications Ser. Nos. 10/068,216 and 10/068,723, which are incorporated herein by reference thereto.

The present application also contains subject matter related to a concurrently filed U.S. Patent Application by Michael S. Schlansker. Vinod Kumar Kathail, Greg Snider, Shail Aditya Gupta, Scott A. Mahike and Santosh G. Abraham entitled "AUTOMATED DESIGN OF PROCESSOR SYSTEMS USING FEEDBACK FROM INTERNAL MEASUREMENTS OF CANDIDATE SYSTEMS". The related application is identified by Ser. No. 09/502,194 and is incorporated herein by reference thereto.

The present application contains subject matter related to a concurrently filed U.S. Patent Application by Santosh G. Abraham entitled "RAPID DESIGN OF MEMORY SYSTEMS USING DILATION MODELING". The related application is identified by Ser. No. 09/378,192 and is incorporated herein by reference thereto.

TECHNICAL FIELD

The present invention relates generally to high performance computer systems and more particularly to the automated design of such systems.

BACKGROUND ART

A vast number of devices and appliances ranging from mobile phones, printers, and cars have embedded computer systems. The number of embedded computer systems in these devices far exceeds the number of general purpose computer systems such as personal computers or servers. In the future, the sheer number of these embedded computer systems will greatly exceed the number of general purpose computer systems.

The design process for embedded computer systems is different from that for general purpose computer systems. There is greater freedom in designing embedded computer systems because there is often little need to adhere to standards in order to run a large body of existing software. Since embedded computer systems are used in very specific settings, they may be tuned to a much greater degree for specific applications. On the other hand, although there is greater freedom to customize and the benefits of customization are large, the revenue stream from a particular embedded computer system design is typically not sufficient to support a custom design.

In the past, there have been a number of attempts at automating the design of embedded computer systems. In one, a template-based processor design space was automatically searched to identify a set of best solutions. In another, a framework for the design of retargetable, application-specific, very long instruction word (VLIW) processors was developed. This framework provided the tools to trade off architecture organization and compiler complexity. A hierarchical approach was proposed for the design of systems consisting of processor cores and instruction/data caches where a minimal area system that satisfied the performance characteristics of a set of applications was synthesized.

Also in the past, there has been research focusing on the development of memory hierarchy performance models. Cache models generally assume a fixed trace and predict the performance of this trace on a range of possible cache configurations. In a typical application of the model, a few trace parameters are derived from the trace and are used to estimate misses on a range of cache configurations. For instance, models for fully associative caches employ an exponential or power function model for the change in work set over time. These models have been extended to account for a range of line sizes. Other models have been developed for direct-mapped caches, instruction caches, multi-level memory hierarchies, and multiprocessor caches.

One analytic cache model estimates the miss rate of set-associative caches using a small set of trace parameters derived from the address trace. In general, the accuracy decreases as the line size increase.

In designing embedded computer systems, the general design space consists of a processor and associated Level-1 instruction, Level-1 data, Level-2 unified caches, and main memory. The number and type of functional units in the processor may be varied to suit the application. The size of each of the register files may also be varied. Other aspects of the processor such as whether it supports speculation or predication may also be changed. For each of the caches, the cache size, the associativity, the line size, and the number of ports can be varied. Given a subset of this design space for an application and its associated data sets, a design objective is to determine a set of cost-performance optimal processors and systems. A given design is cost-performance optimal if there is no other design with higher performance and lower cost.

Because of the multi-dimensional design space, the total number of possible designs can be very large. Even with a few of the processor parameters, this easily leads to a set of 40 or more processor designs. Similarly, there may be 20 or more possible cache designs for each of the three cache types. This means that computer design systems currently require extensive and time-consuming calculations to design current computer systems.

DISCLOSURE OF THE INVENTION

The present invention provides an automatic and retargetable computer design system using a combination of simulation and performance prediction to investigate a plurality of target computer systems. A high-level specification and a predetermined application are used by the computer design system to provide inputs into a computer evaluator. The computer evaluator has reference computer system dependent and independent systems for producing a reference representation and dynamic behavior information, respectively, of the application. The reference representation and information are mated to produce further information to drive a simulator. The simulator provides performance information of a reference computer system. The reference system is the basis from which a desired target system is obtained. The performance information is provided to another computer evaluator, which has a target computer system dependent system for producing a target representation of the application for the plurality of target computer systems. The performance information and the target representation are used by a computer system predictor for quickly estimating the performance information of the plurality of target computer systems in a simulation efficient manner.

The present invention further provides an automatic and retargetable computer design system using simulation to investigate a plurality of reference computer systems. A high-level specification and a predetermined application are used by the computer design system to provide inputs into a computer evaluator. The computer evaluator has reference computer system dependent and independent systems for producing a representation and dynamic behavior information, respectively, of the application. The representation and information are mated to produce a further representation of the application to drive a simulator. The simulator provides performance information of the plurality of reference computer systems in a simulation efficient manner.

The present invention further provides an automatic and retargetable computer design system using performance prediction to investigate a plurality of target computer systems. A high-level specification and a predetermined application are used by the computer design system to provide inputs into a computer evaluator along with performance information of a reference computer system. The computer design system has a target computer system dependent system for producing a plurality of target representations of the application for a plurality of target computer systems. The performance information and the target representations are used by a computer predictor in the computer evaluator for quickly estimating the performance characteristics of the plurality of target computer systems in a simulation efficient manner.

The present invention further provides an automatic and retargetable computer design system using a combination of trace-driven simulation and performance prediction to investigate a plurality of target processors having different cache systems. A high-level specification and a predetermined application are used by the computer design system to provide inputs into a cache evaluator. The cache evaluator has a reference processor dependent assembler for producing relocatable object files and a linker for using the relocatable object files to produce a reference processor dependent executable file. The cache evaluator further has a reference processor independent system for producing an event trace of the application. The file and the trace are trace mated in a trace generator to produce an address trace to drive a cache simulator. The cache simulator provides performance characteristics of the reference computer system. The reference processor performance characteristics are provided to another cache evaluator, which has a target processor dependent assembler and linker for producing the executable files for the plurality of target processor systems. The reference processor performance characteristics and the executable files are used by a cache predictor for quickly estimating the performance characteristics, in terms of the number of misses or stall cycles, of the plurality of target processor systems in a simulation efficient manner uses.

The present invention further provides an automatic and retargetable computer design system using trace-driven simulation to investigate a plurality of reference processors having different memory systems. A high-level specification and a predetermined application are used by the computer design system to provide inputs into a cache evaluator. The cache evaluator has reference processor dependent assembler for producing relocatable object files and a linker for using the relocatable object files to produce a reference processor dependent executable file. The cache evaluator further has a reference processor independent system for producing an event trace of the application. The file and the trace are trace mated in a trace generator to produce an address trace to drive a cache simulator. The cache simulator provides the performance characteristics, in terms of the number of misses or stall cycles, of the plurality of reference processor systems in a simulation efficient manner uses.

The present invention further provides an automatic and retargetable computer design system using performance prediction to investigate a plurality of target processors having different memory systems. A high-level specification and a predetermined application are used by the computer design system to provide inputs into a cache evaluator along with the performance characteristics of a reference cache system. The cache evaluator has an assembler for producing relocatable object files and a linker for using the relocatable object files to produce an executable file. The performance characteristics and the executable files are used by a cache predictor for quickly estimating the performance characteristics, in terms of the number of misses or stall cycles, of the plurality of target processor systems in a simulation efficient manner.

The present invention provides an automated design process to derive the performance of the cache for a specific target processor, application, and cache. A separate design system is subsequently responsible for selecting the particular cache used at each level, based on the performance results provided by this process for a set of cache configurations.

The present invention further provides a computer design system that enables the evaluation of the various memory hierarchy components on a particular processor and application of interest.

The present invention still further provides a computer design system for general purpose systems. Often, architectural or compiler techniques are evaluated solely at the processor level without quantifying their impact on memory hierarchy performance. For instance, code specialization techniques, such as inlining or trace scheduling may improve processor performance, but at the expense of instruction cache performance. The present invention can also be used in these situations to quantify the impact on memory hierarchy performance in a simulation efficient manner.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
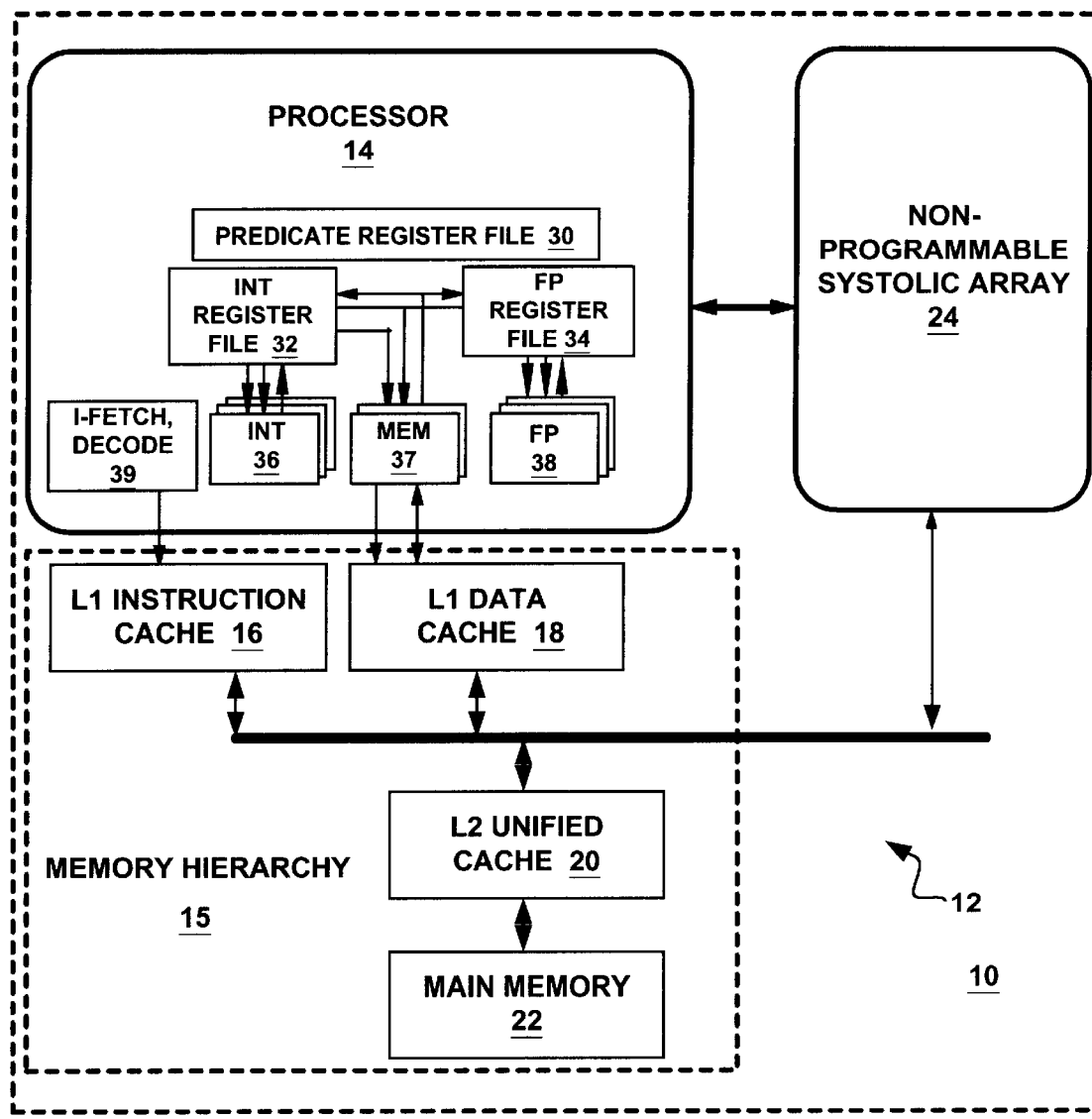
FIG. 1 shows an overall computer design system.

Referring now to FIG. 1, therein is shown the overall design space 10 for a typical computer system 12. In the best mode, the computer system 12 includes a single cluster, heterogeneous, very long instruction word (VLIW) processor 14 and an optional memory hierarchy 15. The memory hierarchy 15 may consist of a Level-1 (L1) instruction cache 16, a Level-1 L1 data cache 18, a Level-2 (L2) unified cache 20, and a main memory 22. Also included in the computer system 12 is a non-programmable systolic array 24, which can be a specified co-processor or media accelerator hardware, that affects the L2 unified cache 20 and/or the main memory 22.

The number and type of functional units in the processor 14 may be varied to suit the application. The size of each of the register files may also be varied, such as the files for a predicate register 30, an integer (INT) register 32, and a floating point (FP) register 34. Other aspects of the processor 14 such as whether it supports speculation or predication (as shown) may also be changed. The processor design space 10 is parameterized, and the parameters, such as the number of integer (INT) units 36, memory (MEM) units 37, and floating point (FP) units 38, can be set to attain the desired levels of performance or cost. The parameters of the instruction fetching (I-fetch) decode unit 39 may also be varied. Each of the caches is also parameterized with respect to the cache size, associativity, line size and number of ports. The parameters chosen for the memory system are such that inclusion is satisfied between the data/instruction caches and the unified cache. The inclusion property states that the unified cache contains all items contained in the data/instruction caches and is enforced in the majority of systems. This property decouples the behavior of the unified cache from the data/instruction caches in the sense that the unified cache misses will not be affected by the presence of the data/instruction caches. Therefore, the unified cache misses may be obtained independently, regardless of the configuration of the L1 caches, by simulating the entire address trace.

Figure 2:
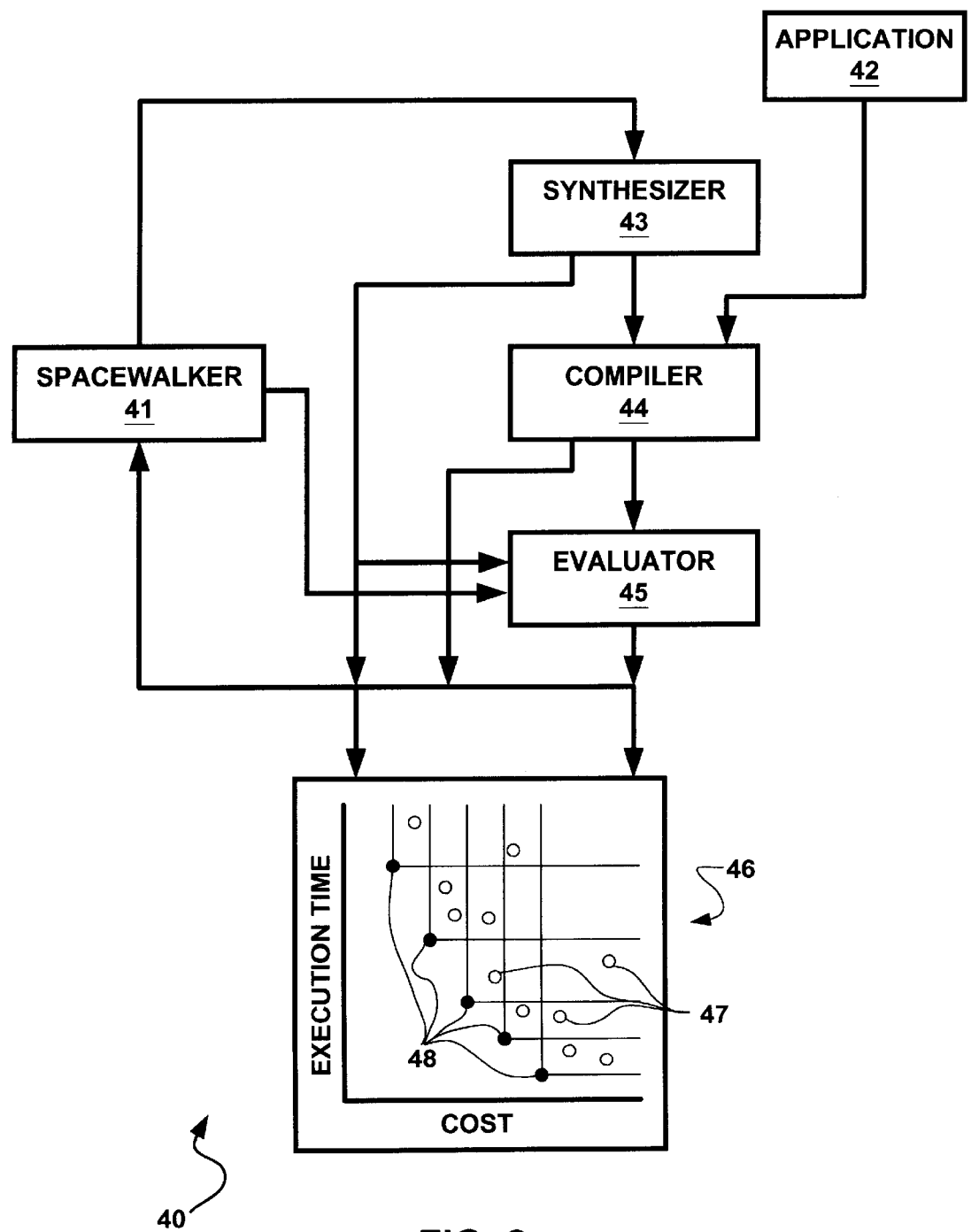
FIG. 2 shows the overall design space with which the present invention is used.

Referring now to FIG. 2, therein is shown an overall computer design system 40, which is an iterative system that determines cost-performance optimal designs within a user-specified range. The driver of the system is a "spacewalker" module 41, which is responsible for providing a description of various computer systems by defining high-level specifications for candidate computer system designs to be investigated. The computer design system 40 is automatically retargetable and derives the cost and performance for each candidate design using a specified application 42 and three subsystems: synthesizer 43, compiler 44, and evaluators 45.

From a high-level specification inputted into the spacewalker module 41, the synthesizer 43 creates the design for the processor 14, the I-format, the memory hierarchy 15, and the optional non-programmable systolic array 24.

This process is described in detail in the U.S. Patent Application to Shail Aditya Gupta et al., entitled "AUTOMATIC DESIGN OF VLIW PROCESSORS", supra, and to the U.S. Patent Application to Michael S. Schlansker et al., entitled "AUTOMATED DESIGN OF PROCESSOR SYSTEMS USING FEEDBACK FROM INTERNAL MEASUREMENTS OF CANDIDATE SYSTEMS". The high-level specification includes the instruction set architecture (ISA) which has the model assembly level language used to program a broad family of processors in a design space. The I-format specifies all of the available binary instruction encodings supported by the processor 14. In the best mode, the synthesizer 43 generates variable-length, multi-template formats to facilitate reducing overall code size. In addition, the synthesizer 43 creates a machine-description file to describe the relevant parts of the system (available resources, operation latencies, number of registers) to the compiler 44.

The compiler 44 uses the machine-description file produced by the synthesizer 43 and the application 42 to map the application 42 into scheduled and register allocated assembly code (assembly code 55 in FIGS. 3 and 4) for the processor 14 in the evaluator 45. It is a flexible compiler system capable of generating highly optimized code for a family of VLIW processors. The compiler 44 is retargetable to all processors in the design space 10 and utilizes the machine description to generate the proper code for the processor 14.

The evaluators 45 separately evaluate the performances of the processor 14, non-programmable systolic array 24, and memory hierarchy 15, which are combined to derive the overall system performance. The performances of the processor 14 and non-programmable systolic array 24 are estimated using schedule lengths and profile statistics. The performance of the memory hierarchy 15 is derived using a combination of trace-driven simulation and performance estimation described hereinafter.

Each computer design 47 is plotted on a cost/performance graph 46 as shown in FIG. 2. The set of points that are minimum cost at a particular performance level identify the set of best designs 48 or the Pareto curve. After the process is completed for one design, the spacewalker module 41 creates a new design and everything is repeated. The spacewalker module 41 uses cost and performance statistics of the previous design as well as characteristics of the application 42 to identify a new design that is likely to be profitable. The process terminates when there are no more likely profitable designs to investigate.

Figure 3:
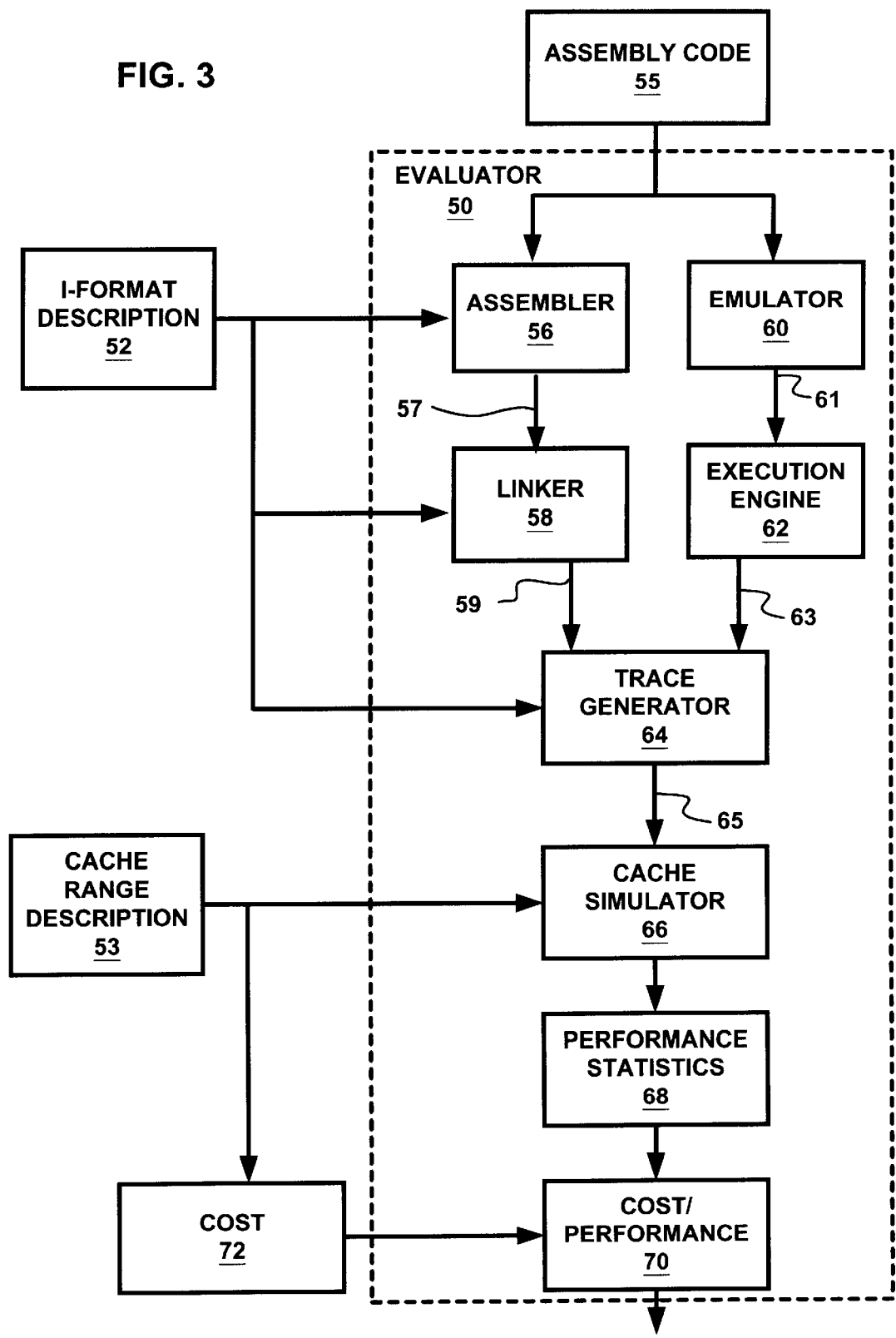
FIG. 3 shows the trace-driven simulation system of the present invention.

Referring now to FIG. 3, therein is shown a trace-driven simulation memory evaluator 50 which is one of the set of evaluators 45 in the computer design system 40 shown in FIG. 2. The evaluator 50 provides a system for trace-driven simulation of the memory hierarchy 15 for a reference computer system as will subsequently be explained.

The evaluator 50 is provided with a customized I-format description 52 of the reference processor 14 from the synthesizer 42, a cache range description 53 from the spacewalker module 41 and a scheduled and register allocated assembly code 55 from the compiler 44. In the evaluator 50, the assembly code 55 is provided to an assembler 56.

The assembler 56 maps the assembly code 55 into a processor-dependent binary representation specified by the I-format description 52. It examines each set of operations that is concurrently scheduled and selects the best template to encode the operations in a single instruction. The assembler 56 uses a greedy template selection heuristic based on two criteria to minimize code size. First, the template that requires the fewest bits is preferred. Second, the template should have sufficient multi-no-op bits to encode any no-op instructions that follow the current instruction.

After the template is selected, the assembler 56 fills in the template bits with the appropriate values for the current instruction. The final output of the assembler 56 is known as a "relocatable object file" 57 and is a binary representation for each procedure in the application 42. The relocatable object file 57 is then inputted into a linker 58.

The linker 58 combines all the relocatable object files 57 for the individual functions of the application 42 into a representation of the application 42, which is a single executable file 59. The linker 58 is responsible for code layout, instruction alignment, and assigning the final addresses to all of the instructions. Branch profile information is used to place blocks of instructions or entire functions that frequently execute in sequence near each other. The goal is to increase spatial locality and instruction cache performance. The instruction alignment rules are derived from a textual processor description file from the I-format description 52. Instructions that are branch targets are aligned on packet boundaries where a packet consists of the set of bits fetched from the target instruction cache in a single cycle. This is to avoid instruction cache fetch stalls for branch targets at the expense of slightly larger code size. The last step in the linker 58 is to use the textual processor description file to assign addresses to all instructions in the single executable file 59. In the best mode, the compiler 44 handles the intra-procedural code layout while the linker 58 is responsible for inter-procedural layout.

The assembler 56 and the linker 58 system provide an executable binary representation of the application 42.

The assembly code 55 is also provided to an emulator 60 in the evaluator 50 which converts the assembly code 55 into an equivalent assembly code 61 to be emulated on an existing computer system (not shown), such as a Hewlett-Packard (HP) workstation. Essentially, the emulator 60 is an assembly code translation tool. The conversion of the assembly code 55 of the application 42 into an executable form can be done in either one of two ways. One way is to create an equivalent high-level program (e.g. a C program) that is compiled with the existing computer system's compiler. Another way is to translate the assembly code into an equivalent assembly code for the system that is compiled with the existing computer system's assembler.

The emulator 60 further instruments the equivalent assembly code 61 to record important dynamic events for memory system evaluation. These events include procedures entered/exited, basic blocks entered, branch directions, and load/store data addresses. The instrumented equivalent assembly code 61 is then provided to a processor independent execution engine 62.

The execution engine 60 compiles the assembly code 61 using a HP workstation system assembler (not shown) and linker (not shown) to produce an instrumented-executable version of the application 42. The instrumented executable equivalent assembly code is run on the HP workstation to produce an event trace 63.

The event trace 63 records the dynamic program behavior as a high-level sequence of tokens in the form of: entering a block of code; executing a load operation; etc. The emulator 60 and the execution engine 62 system provide information on the dynamic behavior of the application. The event trace 63 is dependent on the assembly code 55 produced for the processor 14 but is independent of the I-format and organization of the executable file 59. It should be noted that the event trace 63 produced by the execution engine 62 is independent of the I-format and that, in general, interfaces between the two are processor independent. The event trace 63 is then provided to a processor dependent trace generator 64.

The trace generator 64 receives executable file from the linker 58, the event trace 63 from the execution engine 62, and a textual description from the I-format description 52. The trace generator 64 creates an instruction and/or data address trace 65 that models the application 42 executing on the processor 14. This is accomplished by symbolically executing the executable file 59. The symbolic execution is driven by the event trace 63 produced by the execution engine 62. The event trace 63 identifies the dynamic instructions that must be executed by providing control flow events (e.g., enter a basic block, direction of a branch, or predicate value). The trace generator 64 maps control flow events to the appropriate sequence of instruction addresses obtained from the executable file 59 that are visited to create the instruction trace. The event trace 63 also provides data addresses-accessed by load and store operations. The trace generator 64 passes these addresses through at the time when the load/store is executed to create the data trace.

The trace generator 64 is a system which is configurable to create instruction, data, or joint instruction/data traces as needed for a new address trace 65. In general, the address trace 65 includes instruction and data addresses as well as tags on the addresses that provide additional information on the reference processor 14 such as the level of the memory hierarchy 15 to which a reference trace is directed. Command-line switches may specify the specific type of address trace that is generated by the trace generator 64. For instance, instruction cache simulation may require only the instruction component of the address trace for the trace generator 64 output, which is the address trace 65.

The process of deriving the new address trace 65 from the event trace 63 and an executable file 59 is referred to as "trace mating". Trace mating is utilized to facilitate efficiency and retargetability.

For efficiency, the trace generator 64 combines the instruction set independent event trace 63 along with the instruction set dependent executable file 59 to synthesize the complete new address trace 65. With this approach, a single event trace 63 can be used to derive multiple address traces 65 for processors 14 with different ISAs.

For retargetability, trace mating enables trace-driven simulation of processors 14 with diverse ISAs. The characteristics of the processor instruction set are captured fully in the executable file 59. The trace generator 64 can then synthesize the new address trace 65 for the processor 14 by the symbolic execution of the executable file 59 as specified by the event trace 63.

The address trace 65 from the trace generator 64 is provided to a cache simulator 66.

The cache simulator 66 accepts a parameter list, the cache range description 53, specifying the range of cache designs of interest and the new address trace 65 and is capable of simulating a large range of caches of different sizes and associativities in a single pass. The line size is the only parameter that is fixed. The cache simulator 66 also uses the sophisticated inclusion properties between caches in the memory hierarchy 15 to reduce the amount of state that must be updated, thereby reducing the overall simulation time. In the best mode, all caches (L1 instruction cache 16, L1 data cache 18, and L2 unified cache 20) in the design space 10 for each processor 14 are simulated and the number of misses for each cache are tabulated. Separate runs are needed for each line size that is considered. Also, separate runs are required for each of the caches as each requires a different address stream.

The cache simulator 66 simulates the cache configuration that the address trace 65 is intended to encounter and outputs performance statistics of the computer system 12 as the number of misses for the cache configuration being evaluated. The cache simulator 66 can accept different types of ranges of cache designs, e.g. fully-associative caches with a range of line sizes and a range of cache sizes. The cache simulator 66 may also be used for simulating a set of direct-mapped or set-associative caches with a fixed line size but with a range of cache sizes and range of associativities.

A performance statistics module 68 is shown where the number of misses or stall cycles can be stored. The output of the performance statistics module 68 is combined in a cost/performance module 70 using the cache range description 53 and a cost module 72. The cost module 72 contains the cost information for the various caches and configurations for the computer system 12. The output of the cost/performance module 70 then is output on the graph 40 of FIG. 2.

Increasingly, the memory systems of new embedded and general purpose processor systems consist of multi-level hierarchies of cache memory (viz. instruction, data, and unified caches). The present invention allows automating the process of designing the components of the memory hierarchy for any member of a broad family of processors in an application-specific manner. For a specific target processor, application, and cache hierarchy, the present invention provides an automated design process to derive the performance of the cache hierarchy. A user or separate design system is subsequently responsible for selecting the particular cache used at each level, based on the performance results provided by this process for a set of cache configurations. The present invention provides a set of compilation and simulation modules that enables the evaluation of the various memory hierarchy components on a particular processor and application of interest. Fundamentally, the present invention describes evaluation modules that can be automatically retargeted for any member of a broad range of processors.

Typically, the designer specifies a range for each of the cache parameters. These ranges for the caches are specified so that inclusion is satisfied between any L1 data/instruction caches and a given L2 unified cache. This inclusion requirement is enforced usually in general purpose systems so that the L2 unified cache contains all the items contained in the L1 data/instruction caches. This requirement decouples the behavior of the L2 unified cache from the L1 data/instruction caches in the sense that the unified cache misses will not be affected by the presence of the L1 data/instruction caches. Therefore, the L2 unified cache misses may be obtained independently by simulating the entire address trace, regardless of the configuration of the L1 caches. Without this requirement, each distinct combination of L1 caches and L2 unified cache would have to be simulated using the miss trace from the L1 data/instruction caches.

Generally, high-level software inspects design points whose parameters are within the range and determines suitable overall designs that are cost performance optimal. The present invention produces cache performance metrics for any design point in a simulation efficient manner, viz. the number of data, instruction, and unified cache misses. To reduce computation effort, the cache simulator 66 can be used to simulate multiple cache configurations in a single simulation run where all the cache configurations have the same line size. Using this approach, the number of simulations is reduced from the total number of caches in the design space 10 to the number of distinct cache line sizes. For example, if all caches in the design space 10 have only one or two distinct line sizes, the overall computation effort is reduced by an order of magnitude.

One unique aspect of the present invention is the comprehensive retargetability of the entire memory evaluator 50. Existing design systems are typically built for a particular target processor enabling the design of a cache design space for that processor. Manual retargeting is required when the target processor is changed. This invention incorporates an assembler 56, linker 58, trace generator 64, emulator 60, and cache simulator 66 that work uniformly over a large design space of processor architectures without the need for manual intervention. The interfaces between the modules are specified to be general enough to enable these modules to be automatically exercised in a sequence without manual intervention for a large number of different I-formats and ISAs. This is the key in enabling the automated design of systems where the processor design space and the memory hierarchy design space are simultaneously searched to determine a suitable overall design.

The computer system 12 naturally separates into the processor 14, L1 instruction cache 16, L1 data cache 18, and L2 unified cache 20 subsystems. The overall execution time consists of the processor cycles and the stall cycles from each of the caches. The processor cycles are independently determined for a processor and the stall cycles for each cache configuration. Combined simulation of the processor 14 and its cache configuration can take into account coupling between them and thus produce more accurate results. For instance, sometimes processor execution may be overlapped with cache miss latencies, and the total cycles are less than the sum of the processor cycles and stall cycles. Accounting for such overlaps leads to more accurate evaluation. But, the simulation time required for doing cycle-accurate simulation is so large that it will not be possible to examine a large design space using such accurate simulation techniques. Furthermore, in a processor such overlap is limited unless specifically scheduled for by the compiler. With the present invention, it is more important to explore a large design space than performing high accuracy evaluation at each design point. Once the choices have been narrowed to a few designs, the accurate evaluations can be done on each of the designs in this smaller set.

After a reference processor is defined, the cache subsystems are evaluated only using the traces produced by the reference processor, using the system of FIG. 3. Since the address trace generation and cache simulation are only performed using the reference processor, the total evaluation time due to the iterative process of examining different target computer systems is reduced by a factor equal to the number of processors in the design space.

But the processor design affects the address trace that it generates and does influence the cache behavior. Therefore, using the cache stalls produced with the reference trace in the evaluation of a system with a target processor may lead to significant inaccuracies in evaluation. In the present invention, certain characteristics of the object code produced for the target processor are measured with respect to that for the reference processor. This information is used to adjust the cache misses and stalls for the target processor as described below. In the description below, the target processor above becomes the reference processor for the target processor evaluated below.

Figure 4:
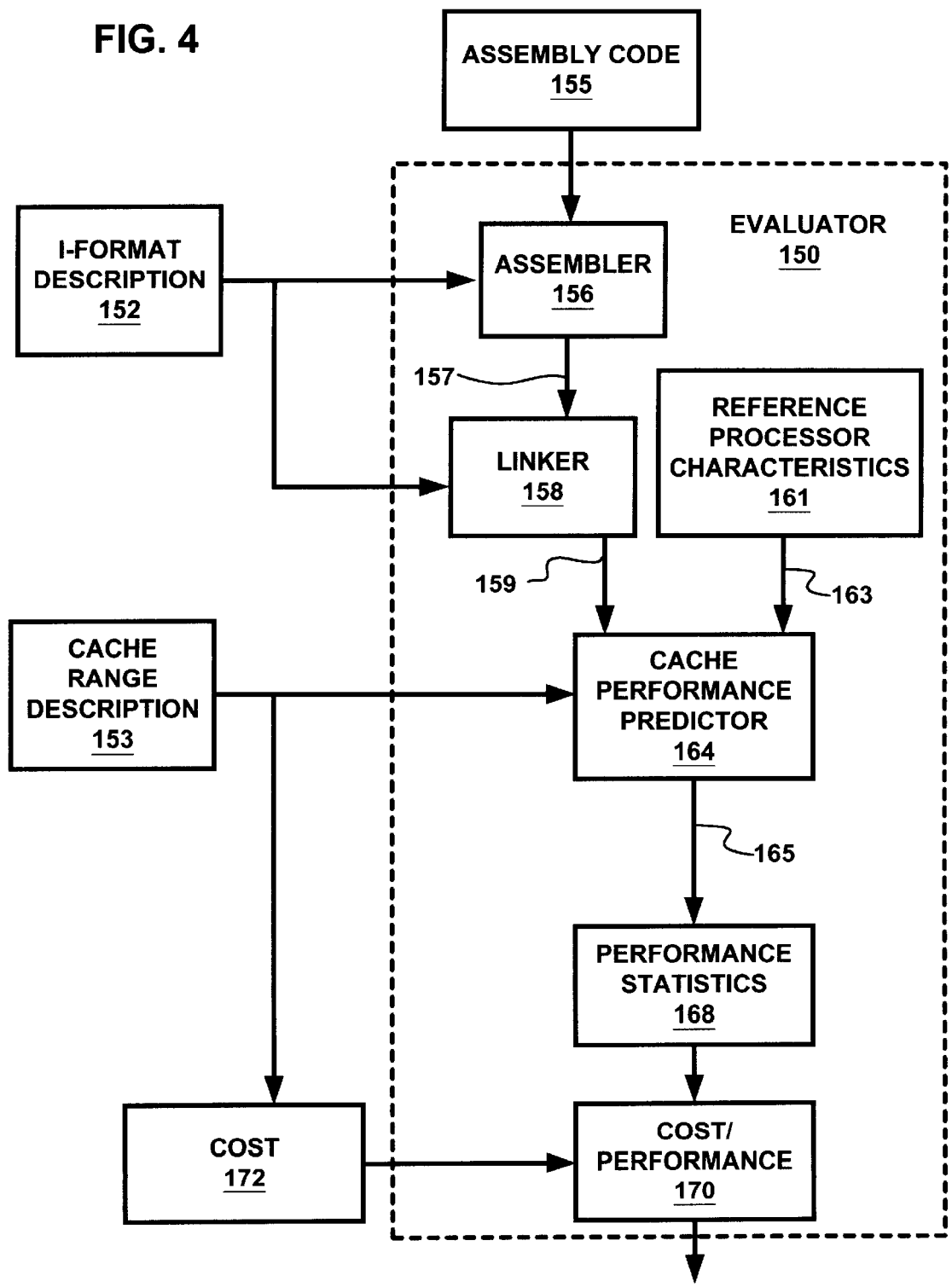
FIG. 4 shows the performance prediction system of the present invention.

Referring now to FIG. 4, therein is shown a performance memory evaluator 150 which is one of the set of evaluators 45 in the computer design system 40 shown in FIG. 2. This evaluator 150 provides a system for performance prediction of the memory hierarchy 15 for a target computer system as will subsequently be explained.

The evaluator 150 is provided with a customized I-format description 152 and a cache range description 153 from the synthesizer 43 through the compiler 44 and a scheduled and register allocated assembly code 155 from the compiler 44. In the evaluator 150, the assembly code 155 is provided to an assembler 156.

The assembler 156 maps the assembly code 55 into a processor-dependent binary representation specified by the I-format description 52 in just the same manner as the assembler 56 of FIG. 3 to output a relocatable object file 157 which is a binary representation for each procedure in the application 42. The relocatable object file 157 is then inputted into a linker 158.

The linker 158 combines all the relocatable object files 157 for the individual functions of the application 42 into a single executable file 159 in the same manner as the linker 58 in FIG. 3. The assembler 156 and the linker 158 system provide an executable binary representation of the application 42.

The assembler 156 and the linker 158 system are shown as separate from the assembler 56 and the linker 58 system to simplify the explanation of the present invention. In practice, they are the same system used first with the reference computer system information and then second with the target computer system information.

Reference processor characteristics 161 and the cache range description 153 are provided by the spacewalker module 41 to be used by a cache performance predictor 164. The cache performance predictor 164 predicts the misses and stall cycles of the memory hierarchy 15 of a target processor, which are similar to the reference processor 14.

A number of different types of cache performance predictors are known to those skilled in the art, but the preferred mode uses the dilation model disclosed in the above mentioned, concurrently filed U.S. Patent Application by Santosh G. Abraham et al., entitled "RAPID DESIGN OF MEMORY SYSTEMS USING DILATION MODELING", supra. Briefly, the dilation model uses traces produced by a reference processor in the design space for a particular cache design and characterizes the differences in behavior between the reference processor and an arbitrarily chosen processor. The differences are characterized as a series of "dilation" parameters, which relate to how much the traces would expand because of the substitution of a target processor. In addition, the system characterizes the reference trace using a set of trace parameters that are part of a cache behavior model. The dilation and trace parameters are used to determine the factors for estimating the performance statistics of target processors with specific memory hierarchies.

Thus, the cache predictor 164 receives the executable file 159, reference processor characteristics 161, and the cache range description 153 to output a prediction of the number of misses or stall cycles of the target processor to a performance statistics module 168.

The output of the performance statistics module 168 is combined in a cost/performance module 170 using the cache range description 153 and a cost module 172. The cost module 172 contains the cost information for the various caches and configurations for the target computer system. The output of the cost/performance module 170 then is output on the graph 40 of FIG. 2.

In summary, a reference processor 14 is defined and the memory hierarchies 15 are evaluated only using the traces produced by the reference processor 14. Since the address trace generation and cache simulation are only performed using the reference processor 14, the total evaluation time due to the iterative process of examining different target computer systems using reference processor performance information is reduced by a factor equal to the number of processors in the design space.

Though primarily intended for the design of embedded systems, the design system of 40 of the present invention is useful even for evaluating general purpose systems. Quite often, architectural or compiler techniques are evaluated solely at the processor level without quantifying their impact on memory hierarchy performance. For instance, code specialization techniques, such as inlining or trace scheduling, may improve processor performance but at the expense of instruction cache performance. The evaluation approach disclosed herein can also be used in these situations to quantify the impact on memory hierarchy performance in a simulation efficient manner.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A system for designing a computer system having a processor and a memory hierarchy, comprising:
   means for generating an event trace of an application program for the computer system, the event trace indicating a sequence of control flow events in the application program that are independent of a design of the processor;
   means for generating an executable file for the application program such that the executable file includes a set of memory addresses that are adapted to the design of the processor;
   trace generator means for generating an address trace in response to the executable file and the event trace such that the address trace includes a sequence of the memory addresses from the executable file that correspond to the sequence of control flow events specified in the event trace;
   component simulator means for generating a set of performance statistics for a component of the memory hierarchy in response to the address trace and a description of the component.

2. The system of claim 1, wherein the trace generator reuses the event trace to generate an address trace for each of a set of possible designs in a design space for the processor.

3. The system of claim 1, wherein the trace generator generates the address trace by mapping each control flow event to a corresponding set of addresses contained in the executable file.

4. The system of claim 1, wherein the component simulator generates a set of performance statistics for each of a set of configurations of the component.

5. The system of claim 1, wherein the component of the memory hierarchy is a cache memory.

6. The system of claim 1, wherein the means for generating the executable file comprises:
   assembler that generates a binary code for the application program in response to a description of an instruction format for the design of the processor such that the binary code depends on the instruction format;
   linker that generates the executable file in response to the binary code and in response to the description of the instruction format for the design of the processor.

7. The system of claim 1, wherein the means for generating an event trace comprises:
   emulator that converts the application program into an equivalent code for an existing computer system including code for recording the control flow events;
   execution engine that generates the event trace by compiling and executing the equivalent code.

8. The system of claim 1, wherein the trace generator generates the address trace by symbolically executing the executable file in response to the control flow events specified in the event trace.

9. The system of claim 1, further comprising means for combining the performance statistics with a set of cost information pertaining to the component.

10. The system of claim 1, further comprising means for measuring characteristics of an executable file for a second design for the processor in comparison to the executable file for the design for the processor and for adjusting the performance statistics accordingly.

11. A method for designing a computer system having a processor and a memory hierarchy, comprising the steps of:

generating an event trace of an application program for the computer system, the event trace indicating a sequence of control flow events in the application program that are independent of a design of the processor;

generating an executable file for the application program such that the executable file includes a set of memory addresses that are adapted to the design of the processor;

generating an address trace in response to the executable file and the event trace such that the address trace includes a sequence of the memory addresses from the executable file that correspond to the sequence of control flow events specified in the event trace;

generating a set of performance statistics for a component of the memory hierarchy in response to the address trace and a description of the component.

12. The method of claim 11, further comprising the step of reusing the event trace to generate an address trace for each of a set of possible designs in a design space for the processor.

13. The method of claim 11, wherein the step of generating an address trace includes the step of mapping each control flow event to a corresponding set of addresses contained in the executable file.

14. The method of claim 11, further comprising the step of generating a set of performance statistics for each of a set of configurations of the component.

15. The method of claim 11, wherein the component of the memory hierarchy is a cache memory.

16. The method of claim 11, wherein the step of generating the executable file comprises the steps of:

generating a binary code for the application program in response to a description of an instruction format for the design of the processor such that the binary code depends on the instruction format;

generating the executable file in response to the binary code and in response to the description of the instruction format for the design of the processor.

17. The method of claim 11, wherein the step of generating an event trace comprises the steps of:

converting the application program into an equivalent code for an existing computer system including code for recording the control flow events;

generating the event trace by compiling and executing the equivalent code.

18. The method of claim 11, wherein the step of generating an address trace includes the step of symbolically executing the executable file in response to the control flow events specified in the event trace.

19. The method of claim 11, further comprising the step of combining the performance statistics with a set of cost information pertaining to the component.

20. The method of claim 11, further comprising the steps of measuring characteristics of an executable file for a second design for the processor in comparison to the executable file for the design for the processor and adjusting the performance statistics accordingly.

21. A computer-readable storage media that contains a computer program that when executed on a computer designs a computer system having a processor and a memory hierarchy, the computer program comprising:

instructions for generating an event trace of an application program for the computer system, the event trace indicating a sequence of control flow events in the application program that are independent of a design of the processor;

instructions for generating an executable file for the application program such that the executable file includes a set of memory addresses that are adapted to the design of the processor;

instructions for generating an address trace in response to the executable file and the event trace such that the address trace includes a sequence of the memory addresses from the executable file that correspond to the sequence of control flow events specified in the event trace;

instructions for generating a set of performance statistics for a component of the memory hierarchy in response to the address trace and a description of the component.

22. The computer readable storage media of claim 21, wherein the computer program further comprising instructions for reusing the event trace to generate an address trace for each of a set of possible designs in a design space for the processor.

23. The computer readable storage media of claim 21, wherein instructions for generating an address trace includes instructions for mapping each control flow event to a corresponding set of addresses contained in the executable file.

24. The computer readable storage media of claim 21, wherein the computer program further comprising instructions for generating a set of performance statistics for each of a set of configurations of the component.

25. The computer-readable storage media of claim 21, wherein the component of the memory hierarchy is a cache memory.

26. The computer readable storage media of claim 21, wherein instructions for generating the executable file comprises:

instructions for generating a binary code for the application program in response to a description of an instruction format for the design of the processor such that the binary code depends on the instruction format;

instructions for generating the executable file in response to the binary code and in response to the description of the instruction format for the design of the processor.

27. The computer-readable storage media of claim 21, wherein instructions for generating an event trace comprises:

instructions for converting the application program into an equivalent code for an existing computer system including code for recording the control flow events instructions for generating the event trace by compiling and executing the event code.

28. The computer-readable storage media of claim 21, wherein instructions for generating an address trace includes instructions for symbolically executing the executable file in response to the control flow events specified in the event trace.

29. The computer-readable storage media of claim 21, wherein the computer program further comprising instructions for combining the performance statistics with a set of cost information pertaining to the component.

30. The computer-readable storage media of claim 21, wherein the computer program further comprising instructions for measuring statistics of an executable file for a second design for a second design; if or the processor in comparison to the executable file for the design for the processor and adjusting the performance statistics accordingly.

* * * * *